United States Patent
Ohtsu et al.

(10) Patent No.: US 7,164,814 B2
(45) Date of Patent: Jan. 16, 2007

(54) OPTICAL ELEMENT AND MANUFACTURING METHOD THEREOF

(75) Inventors: Shigemi Ohtsu, Nakai-machi (JP); Keishi Shimizu, Nakai-machi (JP); Kazutoshi Yatsuda, Nakai-machi (JP); Eiichi Akutsu, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 47 days.

(21) Appl. No.: 11/099,554

(22) Filed: Apr. 6, 2005

(65) Prior Publication Data

US 2005/0196096 A1  Sep. 8, 2005

Related U.S. Application Data

(62) Division of application No. 10/462,774, filed on Jun. 17, 2003, now Pat. No. 6,931,167.

(30) Foreign Application Priority Data

Jun. 27, 2002  (JP) .............................. 2002-187474

(51) Int. Cl.
G02B 6/10 (2006.01)
G02B 6/12 (2006.01)

(52) U.S. Cl. .................... 385/14; 385/129; 385/130

(58) Field of Classification Search .................. 385/14, 385/129–132
See application file for complete search history.

(56) References Cited

U.S. PATENT DOCUMENTS

| 5,020,879 A | 6/1991 | Kuzuta et al. ............. 359/573 |
| 5,136,678 A * | 8/1992 | Yoshimura ................. 385/132 |
| 5,298,366 A | 3/1994 | Iwasaki et al. ............. 430/321 |
| 6,091,874 A * | 7/2000 | Higashi et al. ............. 385/130 |
| 6,355,198 B1 | 3/2002 | Kim et al. ................. 264/259 |
| 6,501,885 B1 * | 12/2002 | Holzner et al. ............... 385/39 |
| 6,535,680 B1 | 3/2003 | Hori et al. ................. 385/130 |
| 6,660,192 B1 | 12/2003 | Kim et al. ................. 264/1.27 |
| 6,868,214 B1 | 3/2005 | Sakata et al. ............... 385/129 |

FOREIGN PATENT DOCUMENTS

| JP | 4-165310 A | 6/1992 |
| JP | 2000-39530 | 2/2000 |
| JP | 2000-39531 | 2/2000 |
| JP | A 2000-235127 | 8/2000 |
| JP | 2000-345383 A | 12/2000 |
| JP | B2 3151364 | 1/2001 |

OTHER PUBLICATIONS

B. Michel, "Printing meets lithography: Soft approaches to high-resolution patterning", IBM J. Res. & Dev., vol. 45 No. 5, Sep. 2001.
Whitesides et al., "The Art of Building Small", Scientific American, pp. 39-47, (with translation), no date.

* cited by examiner

Primary Examiner—Sung Pak
Assistant Examiner—Daniel Petkovsek
(74) Attorney, Agent, or Firm—Oliff & Berridge, PLC

(57) ABSTRACT

A flexible optical element useful for optical wiring is provided, in which a light emitting portion is disposed to a core end face of a flexible polymeric optical waveguide channel sheet having a film substrate clad, a core and a clad layer covering the core. A method which enables of manufacturing the optical element in a simple and convenient manner at a low cost is also provided.

5 Claims, 3 Drawing Sheets

OPTICAL ELEMENT AND MANUFACTURING METHOD THEREOF

CROSS-REFERENCE TO RELATED APPLICATION

This application is a divisional application of U.S. patent application Ser. No. 10/462,774, filed Jun. 17, 2003, issued as U.S. Pat. No. 6,931,167 on Aug. 16, 2005, the entire disclosure of which is incorporated herein by reference in its entirety.

BACKGROUND

This invention relates to an optical element in which a light emitting portion is disposed to a flexible polymeric optical waveguide channel and a manufacturing method thereof.

Methods of manufacturing polymeric waveguide channels proposed so far include, for example, (1) a method of impregnating a film with a monomer, selectively exposing a core portion to change the refractive index and bonding the film (selective polymerization method), (2) a method of coating a core layer and a clad layer and then forming a clad portion by use of a reactive ion etching (RIE method), (3) a method of using photolithography of conducting exposure and development by use of a UV-ray curable resin including a polymeric material with a light sensitive material added therein (direct exposure method), (4) a method of utilizing injection molding, and (5) a method of coating a core layer and a clad layer and then exposing the core portion to change the refractive index of the core portion (photo-bleaching method).

However, the selective polymerization method (1) involves a problem in bonding the film, the method (2) or (3) increases the cost because of the use of photolithography, and the method (4) has a problem in the accuracy of the diameter for the obtained core. Further, the method (5) has a problem in that no sufficient difference for the refractive index can be obtained between the core layer and the clad layer.

At present, only the methods (2) and (3) are practically excellent in view of the performance but they involve the problem of the cost as described above. Then, none of the methods (1) to (5) is suitable to the formation of the polymeric waveguide channel to a large-area, flexible plastic substrate.

Further, as a method of manufacturing a polymeric optical waveguide channel, a method of filling a polymer precursor material for core into a pattern substrate (clad) in which a pattern of grooves as capillaries is formed, then curing the same to prepare a core layer and bonding a planar substrate (clad) thereon has been known. However, since the polymer precursor material is thinly filled and cured not only in the capillary grooves but also between the pattern substrate and the planar substrate entirely to form a thin layer of a composition identical with the core layer, it involves a problem that light leaks through the thin layer.

As one method for overcoming the problems, David Hart has proposed a method of manufacturing a polymeric optical waveguide channel by securing a patterned substrate in which a pattern of grooves as capillaries is formed and a planar substrate by a clamping jig, then sealing a contact portion between the patterned substrate and the planar substrate with a resin, then decreasing the pressure and filling a monomer (diallylisophthalate) solution in the capillaries (Japanese Patent No. 3151364). This is a method of lowering the viscosity of the filling material by use of a monomer instead of use of the polymer precursor material as the core forming resin material, filling the material into the capillary by utilizing the capillary phenomenon while keeping the monomer from filling the portions other than the capillary.

However, since the method uses the monomer as the core forming material, it involves a problem that the volumic shrinkage is large when the monomer is polymerized into a polymer to increase the transmission loss of the polymeric optical waveguide channel.

Further, this is a complicated method of securing the patterned substrate and the planar substrate by clamping, or further sealing the contact portion with a resin, so that it is not suitable for mass production and, as a result, the reduction of the cost cannot be expected. Further, this method cannot be applied to the manufacture of a polymeric optical waveguide channel that uses a film in the thickness of mm order or 1 mm or less as the clad.

Geroge M. Whitesides, et al. of Harvard University have recently proposed a method of a capillary tube micromold as one of lithographic technics, as a new technology of preparing a nano-structure. This is a method of preparing a master substrate by utilizing photolithography, transferring the nano-structure of the master substrate to a polydimethylsiloxane (PDMS) template by utilizing close adhesion and easy releasability of PDMS and casting a liquid polymer into the template by utilizing the capillary phenomenon and curing the same. Detailed illustrative descriptions are contained in SCIENTIFIC AMERICAN, September 2001 (Nikkei Science; December 2001).

Further, Kim Enoch, et al. in the group of George M. Whitesides of Harvard University have filed a patent application regarding a capillary tube micromold method (U.S. Pat. No. 6,344,198).

However, even when the manufacturing method described in the patent is applied to the manufacture of the polymeric optical waveguide channel, since the cross sectional area of the core portion in the optical waveguide channel is small, it takes much time for forming the core portion and is not suitable for mass production. Further, it has a drawback that the monomer solution causes a volumic change when it is polymerized into a polymer, which changes the shape of the core to increase the transmission loss.

Further, B. Michel, et al. of IBM Zurich Research Institute have proposed a lithographic technology at high resolution using PDMS and reported that the technique can provide resolution at several tens μm. Detailed illustrative descriptions are contained in *IBM J. REV. &DEV.* vol. 45 No. 5, September 2001.

As described above, the soft lithographic technique or the capillary tube micromold method using PMDS is a technique which has recently attracted attention mainly in the United States as the nano-technology.

However, in the manufacture of the optical waveguide channel by use of the micromold method as described above, decrease of the volumic shrinkage during curing (accordingly, lowering of the transmission loss) and lowering of viscosity of the filled liquid (such as monomer) for easier filling cannot be compatible with each other. Accordingly, when preferences is attached to the lowering of the transmission loss, the viscosity of the filled liquid cannot be lowered below a certain limit, which retards the filling speed and mass production cannot be expected. Furthermore, the micromold method is based on the premise of using glass or silicon substrates for the substrates and use of a flexible film substrate is not taken into consideration.

By the way, in recent IC technology or LSI technology, attention has been focused on conducting optical wiring between apparatuses, between boards in an apparatus and within chips for improving the operation speed or the integration degree instead of conducting electric wiring at high density.

As the device for optical wiring, Japanese Patent Laid-Open No. 2000-39530, for example, describes an optical element for a polymeric optical waveguide channel having a core and a clad surrounding the core, which has a light emitting element and a light receiving element in the direction of laminating a core and a clad, and having an incident side mirror for incidence of light from the light emitting element to the core and an exit side mirror for emission of light from the core to the light receiving element in which a clad layer is formed in a concave shape at a portion corresponding to an optical channel from the light receiving element to the incident side mirror and from the exit side mirror to the light receiving element to converge the light from the light emitting element and the light from the exit side mirror. Further, Japanese Patent Laid-Open No. 2000-39531 describes an optical element in which light from the light emitting element enters the core end face of a polymeric optical waveguide channel having a core and a clad surrounding the core, wherein the light incident end face of the core is formed so as to provide a convex surface to the light emitting element thereby converging the light from the light emitting element to suppress the waveguide loss.

Further, Japanese Patent Laid-Open No. 2000-235127 describes a photoelectronic integrated circuit in which a polymeric optical waveguide channel is assembled directly on a hybridized photoelectronic circuit substrate in which electronic elements and light elements are integrated.

By the way, when the element described above can be incorporated, for example, by being bent into the apparatus in the optical wiring, the degree of freedom for designing the assembling of the optical wiring can be increased and, as a result, integration degree of IC or LSI can be improved.

However, since both of the optical element and the photoelectronic integrated circuit lack in the flexibility, it is impossible to incorporate the same, for example, by bending into the apparatus. Furthermore, since the optical element and the photoelectronic integrated circuit have to be used with the core end face being formed into a convex shape or use of the mirror together, this inevitably complicates structure. The reason for requiring formation of the core end face into the convex shape or converging of light by use of a lens as described above is that since the semiconductor laser element as the light emitting element used, for example, in the optical element generates a great amount of heat and the heat can no more be dissipated when the element is used merely in close adhesion with the polymeric waveguide channel to cause operation failure, it is necessary to provide a gap between the polymeric waveguide channel portion and the light emitting element to release heat while a diverging angle is present for the spot of a semiconductor laser (accordingly, light diverges as the gap is larger to bring about a difficulty in confining light in the optical waveguide channel).

Further, while both of the optical element and the photoelectronic integrated circuit include the polymeric optical waveguide channel, both are manufactured by utilizing the photolithographic method, which complicates the structure, causes a problem such as liquid wastes and results in large environmental loads.

As described above, the flexible polymeric optical waveguide channel sheet itself has not been provided at all so far and, in addition, an idea of connecting the light emitting element to the end face of the polymeric optical waveguide channel sheet thereby forming an optical element used for light optical wiring to avoid loss of flexibility has not been proposed at all.

SUMMARY

This invention has been achieved in view of the foregoing problems and intends to provide an optical element having flexibility which is useful for optical wiring. This invention also intends to provide a method of manufacturing an optical element of preparing the optical element described above by a simple and convenient method at an extremely low cost.

According to an aspect of this invention, an optical element includes a flexible polymeric optical waveguide channel sheet having a clad including a flexible film substrate, a core of a curing product of a UV-ray curable resin or a thermosetting resin disposed on the clad and a clad layer formed so as to cover the core, and a light emitting portion disposed to an end face of the optical waveguide channel sheet.

According to another aspect of this invention, a method of manufacturing an optical element has the steps of: forming a layer of a template-forming resin material to an original substrate in which convexes for optical waveguide channel are formed, then peeling the same to form a mold, and then cutting both ends of the mold to expose concaves corresponding to the convexes for optical waveguide channel formed to the mold, thereby preparing a template; closely adhering a flexible film substrate for clad having good adhesion with the template to the template; bringing one end of the template which is adhered with the flexible film substrate for clad into intimate contact with a UV-ray curable resin or a thermosetting resin to form a core and making the UV-ray curable resin or the thermosetting resin intrude by a capillary phenomenon to the concaves of the template; curing the intruded UV-ray curable resin or the intruded thermosetting resin and peeling the template from the flexible film substrate for clad; and forming a clad layer on the flexible film substrate for clad formed with the core, thereby preparing a flexible polymeric optical waveguide channel sheet and then attaching a light receiving portion to the core end face of the sheet.

BRIEF DESCRIPTION OF THE DRAWINGS

Preferred embodiments of this invention will be described in details based on the followings, wherein.

DETAILED DESCRIPTION OF EMBODIMENTS

The optical element according to this invention includes a flexible polymeric optical waveguide channel sheet having a clad including a flexible film substrate, a core made of a curing product of a UV-ray curable resin or a thermosetting resin disposed on the clad and a clad layer formed so as to cover the core, and a light emitting portion disposed to a core end face of the optical waveguide channel sheet. In the optical element according to the invention, since no optical channel changing device such as a lens or a mirror is required, it is extremely simplified as the device. Further, in the optical element according to the invention, since the flexible polymeric optical waveguide channel sheet is used and the light emitting portion is disposed to the end face thereof, flexibility is high over the entire device and the device can be deformed easily such as by bending or can be incorporated in a deformed state into an integrated circuit to greatly enhance the integration degree of the integrated circuit in conjunction with the simplification of the element as described above.

The optical element according to this invention can be used for wide applications such as optical wiring in various stages, for example, optical wiring between apparatuses, between boards in an apparatus and between chips in the board.

Figure 1:
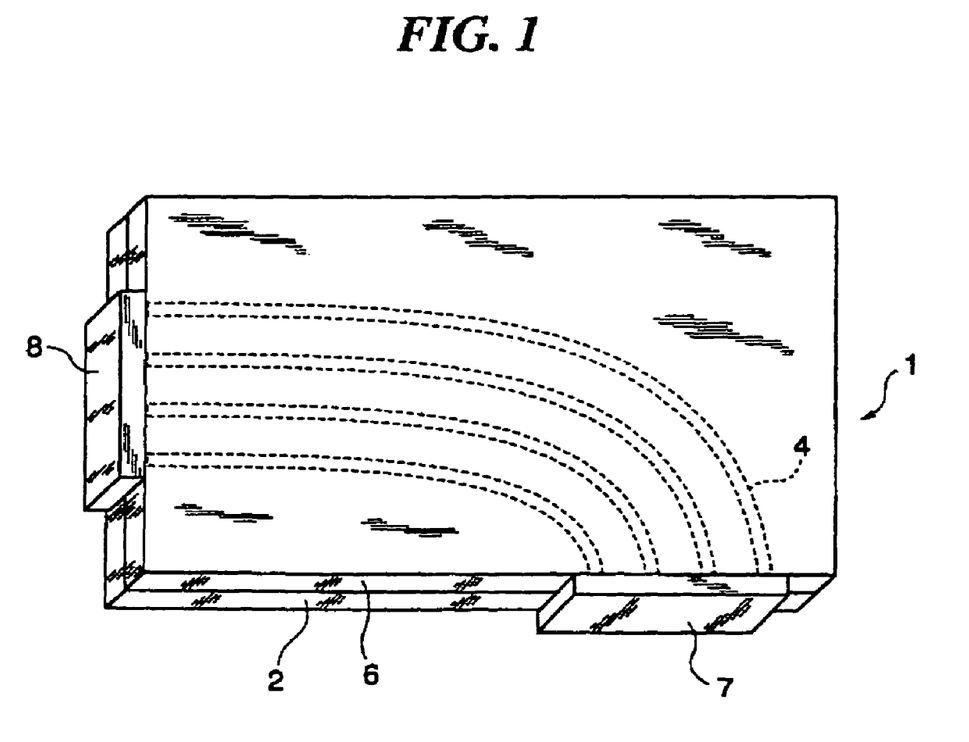
FIG. 1 is a conceptual view illustrating an example of an optical element according to this invention.

FIG. 1 shows an example of an optical element according to this invention as a conceptual view. Shown in FIG. 1 are an optical element 1, a lower clad (flexible film substrate clad) 2, a core 4, a clad layer 6, a light emitting portion 7 and a light receiving portion 8 respectively.

Further, the method of manufacturing the optical element according to this invention is conducted by preparing a flexible polymeric optical waveguide channel sheet and then attaching a light emitting portion to a core end face. The method of preparing the flexible polymeric optical waveguide channel sheet includes the following steps of:

1) forming a layer of a template-forming resin material to an original substrate in which convexes for optical waveguide channels are formed, then peeling the same to form a mold and then cutting both ends of the mold so as to expose concaves corresponding to the convexes for the optical waveguide channel formed in the mold to prepare a template, 2) closely adhering a flexible film substrate for clad to form a clad having good adhesion with the template to the template, 3) bringing one end of the template closely adhered with the film substrate for clad into contact with a UV-curable resin or a thermosetting resin to form a core and making the UV-ray curable resin or the thermosetting resin intrude by a capillary phenomenon into the concaves of the template, 4) curing the intruded UV-ray curable resin or the intruded thermosetting resin and peeling the template from the flexible film substrate for clad, and 5) forming a clad layer on the flexible film substrate for clad to which the core is formed.

The method of manufacturing the flexible polymeric optical waveguide channel sheet according to this invention (hereinafter sometimes referred to simply as an optical waveguide channel sheet) is based on the finding that when a flexible film substrate for clad having good adhesion with the template (hereinafter simply referred to as film substrate for clad, film substrate, etc.) to the template as described above, the UV-ray curable resin or the thermosetting resin can be made to intrude only into the concaves without causing a gap between the template and the film substrate for clad except for the concaved structure formed to the template even when both of them are not secured by use of a special unit (fixing unit as described in Japanese Patent No. 3151364). The method of manufacturing the polymeric optical waveguide channel according to this invention is extremely simplified in view of the manufacturing steps, can manufacture the polymeric optical waveguide channel easily and enables manufacture of the polymeric optical waveguide channel at an extremely low cost compared with the existent method of manufacturing the polymeric optical waveguide channel. Further, the manufacturing method for the polymeric optical waveguide channel according to this invention can provide a flexible polymeric optical waveguide channel with less loss, at high accuracy and enabling easy attachment to various kinds of equipment. Further, the method can freely set the shape and the like of the polymeric optical waveguide channel.

Then, in the method of manufacturing the optical element according to this invention, since the light emitting portion may be merely attached to the end face of the optical waveguide channel sheet manufactured as described above, this is an extremely simple and convenient method and capable of reducing the cost to such an extent as comparison with optical elements using existent polymeric optical waveguide channels is unreasonable.

At first, the outline for the method of manufacturing the optical waveguide channel sheet according to this invention is to be explained with reference to FIG. 2.

Figure 2A:
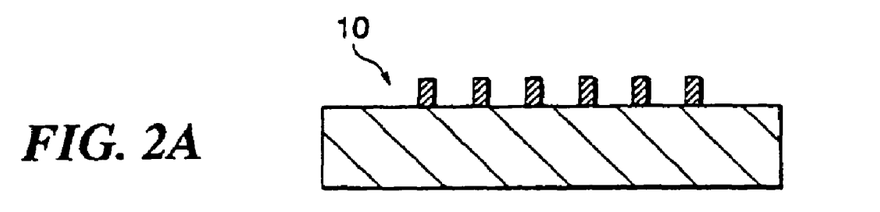
FIGS. 2A–2G is a schematic view illustrating the steps of manufacturing an optical waveguide channel sheet of this invention.
Figure 2B:
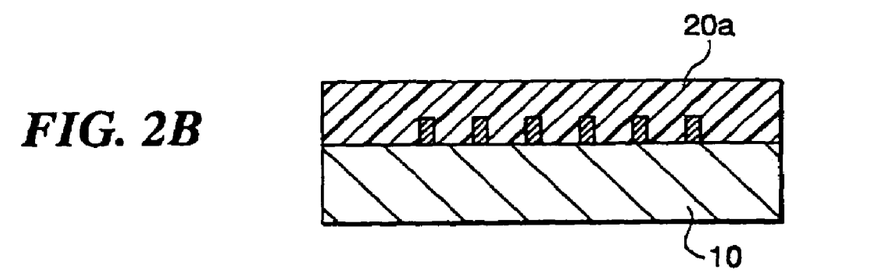
Figure 2C:
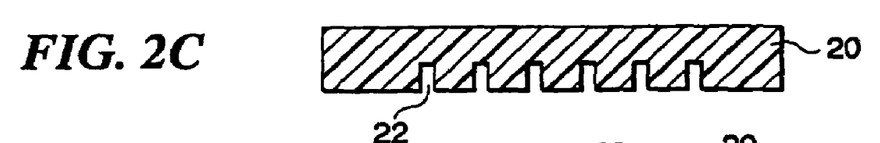

FIG. 2A shows an original substrate to which convexes 12 for optical waveguide channel are formed. At first, as shown in FIG. 2B, a layer 20a of a template-forming resin material (for example, cured layer of a curable resin) is formed to the surface of the original substrate 10 to which convexes 12 for optical waveguide channel are formed. Then, the layer 20a of the template-forming resin material is separated from the original substrate 10 (mold transfer) and then both ends of the mold are cut so as to expose concaves 22 corresponding to the convexes for optical waveguide channel formed to the mold to prepare a template 20 (not illustrated) (refer to FIG. 2C).

Figure 2D:
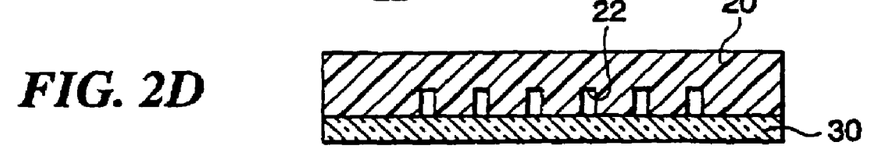
Figure 2E:
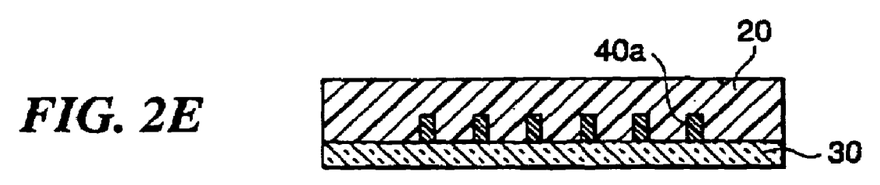
Figure 2F:
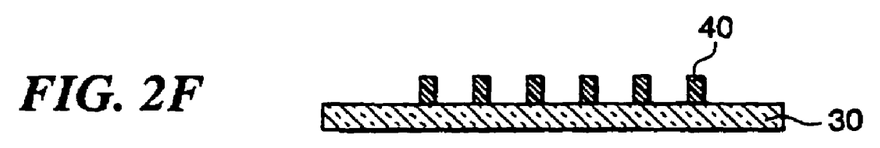

A film substrate 30 for clad having good adhesion with the template is adhered closely to the thus prepared template (refer to FIG. 2D). Then, one end of the template is in contact with a curable resin 40a and the resin is made to intrude into the concaves 22 of the template by utilizing the capillary phenomenon. FIG. 2E shows the state where the curable resin is filled in the concaves of the template. Then, the curable resin in the concaves is cured and then the template is peeled (not illustrated). As shown in FIG. 2F, convexes for optical waveguide channels (cores) 40 are formed on the film substrate for clad.

Figure 2G:
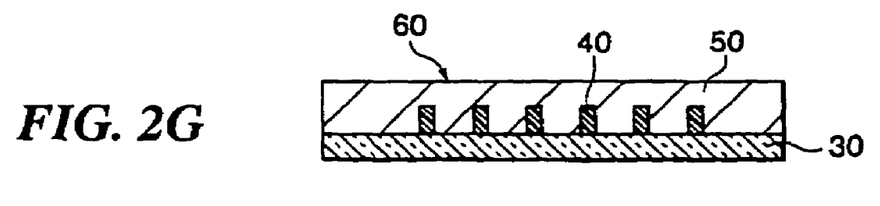
Figure 3A:
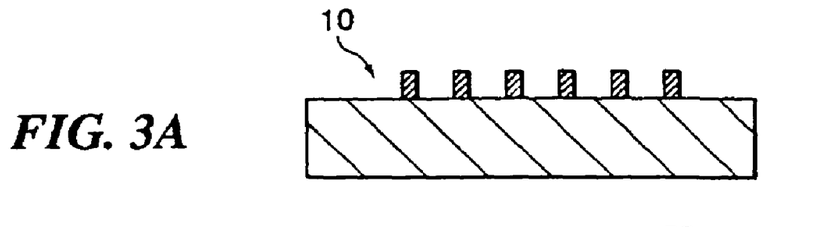
FIGS. 3A–3G is a schematic view illustrating other steps of manufacturing an optical waveguide channel sheet of this invention.
Figure 3B:
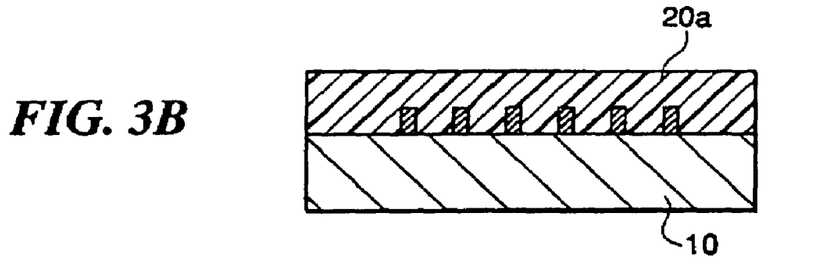
Figure 3C:
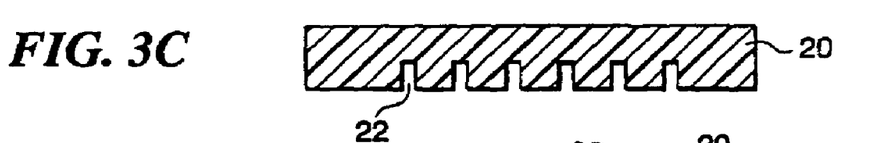
Figure 3D:
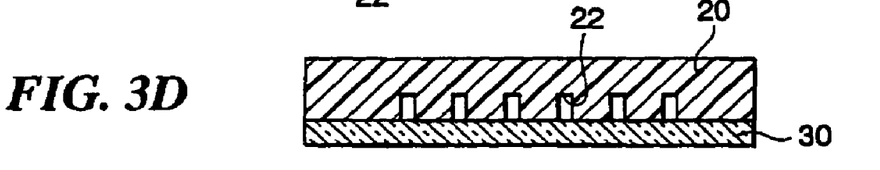
Figure 3E:
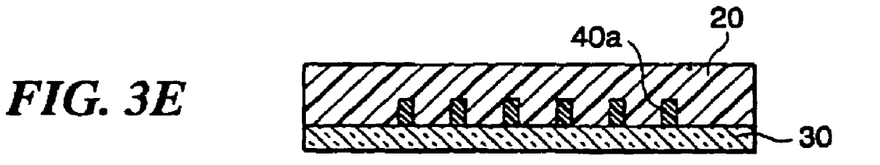
Figure 3F:
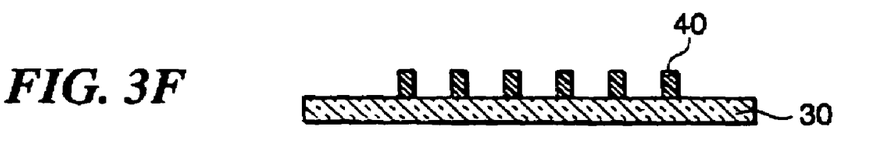
Figure 3G:
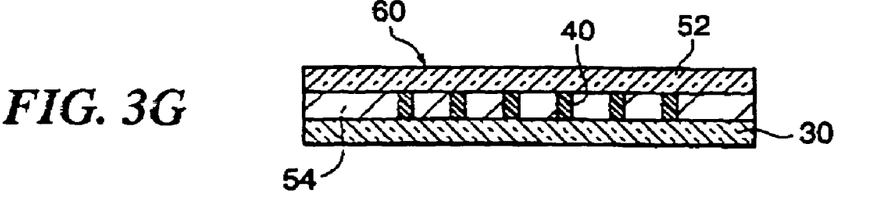

Further, an optical waveguide channel sheet 60 according to this invention is manufactured by forming a core layer 50 to the core forming surface of the film substrate for clad (refer to FIG. 2G).

Further, FIG. 3 shows an example of adhering a film as a clad on the film substrate to which the core is formed. From FIG. 3A to FIG. 3F are in common with the steps represented by FIG. 2A to FIG. 2F showing the steps starting from the original substrate to the formation of the core on the film substrate. FIG. 3G shows a step of bonding a film 52 to form a clad on the core forming the film substrate by use of an adhesive 54.

The method of manufacturing the optical waveguide channel sheet according to the invention will be explained in the sequence of the steps.

1) Step of forming a layer of a template-forming resin material to an original substrate in which convexes for optical waveguide channels are formed, then peeling the same to form a mold and then cutting both ends of the mold so as to expose concaves corresponding to the convexes for optical waveguide channels formed to the mold, thereby preparing a template.

<Preparation of Original Substrate>

For the preparation of the original substrate in which convexes for optical waveguide channels (convexes corresponding to the core) are formed, an existent method, for example, a photolithographic method can be used with no particular restriction. Further, a method of manufacturing a polymeric optical waveguide channel by an electrodeposition method or a photoelectrodeposition method filed previously by the present applicant (Japanese Patent Laid-Open No. 2002-333538) is also applicable to the preparation of the original substrate. The size of the convexes for optical waveguide channels formed to the original substrate is properly determined depending, for example, on the application of the polymeric optical waveguide channel. Generally, in a case of an optical waveguide channel for use in single mode, a core of about 10 µm square is used, while a core of about 50 to 100 m square is used in a case of an optical waveguide channel for use in multimode, but an optical waveguide channel having an even larger core portion such as about several hundreds µm may also be utilized depending on the application.

<Preparation of Mold>

The mold is prepared by forming a layer of the template resin material to the optical waveguide channel surface of the original substrate prepared as described above and peeling the same.

It is preferred that the template resin material can be peeled easily from the original substrate and has mechanical strength and dimensional stability at or above a certain level as the template (used repetitively). The layer of the template resin material is formed of a template-forming resin which may be optionally incorporated with various additives.

Since individual optical waveguide channels formed to the original substrate have to be transferred accurately to the template-forming resin, the resin preferably has a viscosity at a certain limit or less, for example, about 2000 to 7000 mPa·s. Further, for controlling the viscosity, a solvent may be added to such an extent as the solvent gives no undesired effect.

For the template-forming resin, a curable silicone resin (thermosetting or room temperature curing type) is preferably used with a view point of peeling property, mechanical strength and dimensional stability. Further, the resin of the type described above and a liquid resin of low molecular weight is preferably used since a sufficient penetrating property is expected. The viscosity of the resin is preferably about 500 to 7,000 mPa·s, and, further preferably, about 2000 to 5000 mPa·s.

As the curable silicone resin, those containing methyl siloxane group, ethyl siloxane group or phenyl siloxane group are preferred and a curable dimethyl siloxane resin is particularly preferred.

Further, it is desirable that releasing treatment such as coating of a releasing agent is applied in advance to the original substrate to promote releasing from the template.

The template resin material layer is formed to the optical waveguide channel surface of the original substrate, for example, by forming a layer of a template-forming resin by a method of coating or casting the template-forming resin to the surface and then applying drying treatment or curing treatment as required.

The thickness for the template resin material layer is properly determined with the handleability as the template taken into consideration and, generally, it is appropriately about from 0.1 to 50 mm.

Subsequently, the template resin material layer and the original substrate are peeled to form a mold.

<Preparation of Template>

Then, both ends of the mold are cut so as to expose concaves corresponding to the convexes for optical waveguide channel formed to the mold to prepare a template. The both ends of the mold are cut for exposing the concaves for making the UV-ray curable resin or the thermosetting resin intrude by the capillary phenomenon to the concaves of the template in the subsequent step.

It is preferred that the surface energy of the template is from 10 dyne/cm to 30 dyne/cm, more preferably, within a range from 15 dyne to 24 dyne/cm from a viewpoint of close adhesion with the substrate film.

Preferably, Share rubber hardness of the template is 15 to 80, preferably, 20 to 60 from a viewpoint of the mold forming performance and the peeling property.

It is preferred that the surface roughness of the template (square mean roughness (RMS)) is 0.5 µm or less, preferably, 0.1 µm or less from a viewpoint of the mold formation performance.

2) Step of closely bonding film substrate for clad of good close adhesion with template to template Since the optical element according to this invention is used for optical wiring in various stages, the material for the flexible film substrate is selected depending on the application of the optical element while considering, for example, optical characteristics such as refractive index and light transmittance, mechanical strength, heat resistance, adhesion with the template and flexibility. The film can include, for example, cycloaliphatic acrylic film, cycloaliphatic olefin film, cellulose triacetate film and fluoro resin-containing films. It is desirable that the refractive index of the film substrate is less than 1.55 and, preferably, less than 1.53 in order to ensure the difference of the refractive index with respect to that of the core.

As the cycloaliphatic acryl film, OZ-1000, OZ-1100 and the like in which alicyclic hydrocarbon such as tricyclodecane is introduced into the ester substituents are used.

Further, the cycloaliphatic olefin film can include those having a norbornene structure in the main chain and those having a norbornene structure in the main chain and having polar groups such as alkyloxy carbonyl group (alkyl groups of 1 to 6 carbon atoms or cycloalkyl groups) on the side chain. Among them, the cycloaliphatic olefin resins having the norbornene structure in the main chain as described above and polar groups such as alkyloxy carbonyl groups on the side chain are particularly suitable for the manufacture of the optical waveguide channel sheet of this invention since they have excellent optical characteristics such as a low refractive index (refractive index of about 1.50, and capable of ensuring the difference of refractive index to that of the core and clad) and high optical transmittance, and are excellent in close adhesion with the template as well as in heat resistance.

Further, the thickness of the film substrate is selected with flexibility, rigidity and easy handlability taken into consideration and, generally, it is preferably about 0.1 mm to 0.5 mm.

3) Step of bringing one end of template adhered with film substrate for clad into contact with UV-ray curable resin or thermosetting resin as core and making UV-ray curable resin or thermosetting resin intrude by capillary phenomenon into concaves of mold.

In this step, for filling the UV-ray curable resin and the thermosetting resin by the capillary phenomenon into a gap formed between the mold and the film substrate (concaves of the template), it is necessary that the UV-ray curable resin and the thermosetting resin used have a sufficient low viscosity to enable filling and that the refractive index of the curable resin after curing is higher than that of the polymeric material constituting the clad (0.02 or more of difference to that of the clad). In addition, for reproducing at high accuracy an original shape of the convexes for optical wave guide channel formed to the original substrate, it is necessary that the volumic change of the curable resin before and aftercuring is small. For example, decrease in the volume causes waveguide loss. Accordingly, it is desirable for the curable resin that the volumic change is as little as possible and it is desirably 10% or less, preferably, 6% or less. Lowering of the viscosity by the use of a solvent is preferably avoided since this increases the volumic change before and after curing.

Accordingly, it is preferred that the viscosity of the curable resin is from 10 mPa·s to 2000 mPa·s, preferably, 20 mPa·s to 1000 mPa·s and, further preferably, 30 mPa·s to 500 mPa·s.

Further, epoxy type, polyimide type, UV-ray curable acryl type resins are used preferably as the UV-curable resin.

Further, in this step, for promoting the filling of the UV-ray curable resin or the thermosetting resin by the capillary phenomenon to the concaves of the mold by bringing one end of the template adhered with the film substrate into contact with the UV-curable resin or the thermosetting resin as a core, it is desirable that the entire system is depressurized (to about 0.1 to 2000 Pa). Instead of depressurizing the entire system, it may be sucked by a pump from an end different from the one in contact with the curable resin, or it may be pressurized at one end in contact with the curable resin.

Further, for promoting the filling, it is also an effective measure to further lower the viscosity of the curable resin by previously heating the curable resin to be in contact with one end of the template instead of or in addition to the depressurization or pressurization described above.

It is necessary that the refractive index of the curing product of the UV-ray curable resin or the thermosetting resin of the core is greater than that of the film substrate as the clad (including the clad layer in the subsequent step (5)) and it is 1.53 or, more preferably, 1.55 or more. The difference of the refractive index between the clad (including the clad layer in the subsequent step (5)) and the core is 0.02 or more and, preferably, 0.05 or more.

4) Step of curing intruded UV-ray curable resin or thermosetting resin and peeling template from film substrate The intruded UV-ray curable resin or the thermosetting resin is cured. For curing the UV-ray curable resin, UV-ray lamp, UV-ray LED or UV ray irradiation apparatus and the like are used. Further, for curing the thermosetting resin, heating in an oven is adopted.

Further, the template used in the steps (1) to (3) above can also be used as it is as the clad layer, in which it is not necessary to peel the template and it can be used as it is as the clad layer.

5) Step of forming clad layer on film substrate formed with core

A clad layer is formed on a film substrate formed with a core. The clad layer includes, for example, films (for example, a film substrate as used in the preceding step (2) is used in the same manner), layers formed by coating and curing curable resins (UV-ray curable resins, thermosetting resins) and polymeric films obtained by coating and drying a solvent solution of a polymeric material. When the film is used as the clad layer, the film is bonded by use of an adhesive in which the refractive index of the adhesive is preferably near to the refractive index of the film.

The refractive index of the clad layer is, preferably, 1.55 or less and, more preferably, 1.53 or less for ensuring the difference of the refractive index relative to that of the core. Further, it is preferred that the refractive index of the clad layer is equal with the refractive index of the film of the substrate from a viewpoint of confinement of light.

In the manufacturing method of the optical waveguide channel sheet according to this invention, combined use of a thermosetting silicone resin, in particular, a thermosetting dimethyl siloxane resin as the template material and a cycloaliphatic olefin resin having a norbornene structure in the main chain and having polar groups such as alkyl oxycarbonyl groups on the side chain as the film material provides particularly high adhesion between both of them and can fill the concaves with the curable resin rapidly by the capillary phenomenon even when the cross sectional area of the concaves is extremely small (for example, 10×10 μm rectangular shape).

Further, the template can also be used as the clad layer, in which it is preferred that the refractive index of the template is 1.5 or less and the template is applied with ozone treatment for improving the adhesion between the template and the core material.

Then a light emitting portion is attached to the core end face of the optical waveguide channel sheet prepared as described above. For improving the integration degree of an integrated circuit, a surface light emitting laser array (VCSEL) is used preferably for the light emitting portion.

Since a semiconductor laser device of the surface light emitting laser array generates a great amount of heat, it is necessary to keep a distance between the semiconductor laser device and the core end face in order to prevent undesired effects by the heat generation. However, since the semiconductor laser beam has a diverging angle, when the distance exceeds a certain limit, the laser beam spot diameter at the core end face exceeds an allowable value for the core (for example, the allowable diameter is 45 μm for a core diameter of 50 μm).

However, with the spot diameter of the semiconductor laser and the diverging angle of the laser beam in the surface light emitting laser taken into consideration, the semiconductor layer and the core end face can be spaced apart to such an extent as sufficiently avoiding the effect of heat generation without using the lens or the like.

For example, in a case of attaching a surface light emitting laser array with a spot diameter of the semiconductor laser of 10 μm, the beam diverging angle of 25° and an array distance of 250 μm (VCSEL-AM-0104, manufactured by Fuji Xerox Co., Ltd.) to the end face of a multimode polymeric optical waveguide channel sheet with the core diameter of 50 μm, since the laser beam spot diameter at the core surface is allowable to about 45 μm, the semiconductor layer and the core end face can be spaced apart up to 79 μm as the maximum. When the laser beam diameter at the core end face is set to 30 μm, the distance between the semiconductor laser and the core end face is about 45 μm. With such an extent of the distance, generated heat can be released sufficiently even when considering the temperature elevation of the semiconductor laser device up to about 100° C.

Accordingly, a laser array in which the spot diameter of the semiconductor laser is 1 to 20 μm and the diverging angle of the laser beam is about 5° to 30° in the surface light emitting laser array is used preferably. The array distance is preferably about 100 to 500 μm. For example, VCSEL-AM- 0104, VCSEL-AM-0112 and the like manufactured by Fuji Xerox Co., Ltd. are used preferably.

Further as a unit that keeps the distance between the core end face of the optical waveguide channel sheet and the semiconductor laser of the surface light emitting laser array as described above, a frame of a sufficient height to keep the distance may be disposed to the surface of the light emitting laser array, and the frame and the optical waveguide channel sheet are fixed, for example, by use of adhesives.

Further, in the optical element according to this invention, a light receiving portion may be disposed in addition to the light emitting portion. A photodiode array or the like is used preferably as the light emitting portion. For the photodiode array, those having a sensitivity in the same ultraviolet wavelength as the surface light emitting laser array and having high sensitivity such as Si photodiode array or GaAs photodiode array are preferred.

EXAMPLES

This invention is to be explained more specifically with reference to examples but the invention is not restricted to such examples.

Example 1

After coating a thick film resist (SU-8, manufactured by Microchemical Co.) to an Si substrate by a spin coating method, it was prebaked at 80° C., exposed through a photomask and developed to form four convexes each of a square cross section (width: 50 µm, height: 50 µm) as shown in FIG. 1. The distance between each of the convexes was set to 250 µm. Then, it was postbaked at 120° C. to prepare an original substrate for manufacturing an optical waveguide channel core.

Then, after coating a releasing agent to the original substrate, a thermosetting dimethyl siloxane resin (SYLGARD 184, manufactured by Dow Corning Asia Co.) was cast and cured by heating at 120° C. for 30 minutes and then peeled to prepare a mold having concaves corresponding to the convexes of the square cross section (mold thickness: 3 mm). Further, both ends of the mold were cut to prepare an input/output portion for the following UV-ray curable resin to form a template.

The template and a film substrate of 188 µm thickness (ARTON film, manufactured by Nippon Synthesis Rubber Co., refractive index: 1.510) slightly larger than the template were adhered closely. Then, when a UV-ray curable resin at a viscosity of 1300 mPa·s (PJ3001, manufactured by JSR Co.) was dripped by several drops to the input/output portion at one end of the template, the concaves were filled with the UV-ray curable resin by the capillary phenomenon. Then, the upper portion of the template was irradiated with UV-light at 50 mW/cm² for 5 minutes to conduct UV curing. When the template was peeled from the ARTON film, a core of the same shape as that of the convexes of the original substrate was formed on the ARTON film. The refractive index of the core was 1.591.

Then, after coating a UV-ray curable resin having a refractive index after curing of 1.510 which is identical with that of the ARTON film (manufactured by JSR Co.) over the entire core forming surface of the ARTON film, UV-light at 50 mW/cm² was applied for 5 minutes to conduct UV-ray curing (film thickness after curing was 10 µm). A flexible optical waveguide channel sheet (50 mm×300 mm) was obtained. The loss of the polymeric optical waveguide channel was 0.33 dB/cm.

Then, a 1×4 surface light emitting laser array (VCSEL-AM-0104, manufactured by Fuji Xerox Co., Ltd., with a spot diameter of the semiconductor laser of 10 µm, a beam diverging angle of 25° and an array distance of 250 µm) was attached to the core end face of the optical waveguide channel sheet prepared as described above at a gap of 50 µm to form a flexible polymeric waveguide channel with the surface light emitting laser array.

Example 2

An original substrate for preparing an optical waveguide channel having four convexes each of a square cross section (width: 50 µm, height: 50 µm) was by the same method as in Example 1. Then, after preparing a mold in the same manner as in Example 1, both ends were cut to form a template. The template and an ARTON film (thickness: 180 µm) slightly larger than the template were closely adhered and, when several drops of a thermosetting resin at a viscosity of 500 mPa·s (manufactured by JSR Co.) were dripped to the input/output portion at one end of the template, the concaves were fill with the thermosetting resin by the capillary phenomenon. It was thermally cured by heating for 30 minutes in an oven at 130° C. When the template was peeled from the ARTON film, a core of the same shape as the original substrate convexes was formed on the ARTON film. The refractive index of the core was 1.570. Further, after coating, a thermosetting resin with the refractive index after curing being identical with the ARTON film (manufactured by JSR Co.) over the entire surface of the core forming surface of the ARTON film, it was heat-cured (film thickness after curing: 10 µm). A flexible optical waveguide channel sheet (50 mm×300 mm) was obtained. The loss of the polymeric optical waveguide channel was 0.33 dB/cm.

Then, a 1×4 surface light emitting laser array (VCSEL-AM-0104, manufactured by Fuji Xerox Co., Ltd.) was attached at a 50-µm gap to the core end face of the optical waveguide channel sheet prepared as described above to form a polymeric waveguide channel with the surface light emitting laser array.

Example 3

An original substrate for preparing an optical waveguide channel having for convexes each of a square cross section (width: 50 µm, height: 50 µm) by the same method as in Example 1. Then, after preparing a mold in the same manner as in Example 1, both ends were cut to form a template. The template and an ARTON film (thickness: 180 µm) slightly larger than the template were closely adhered and several drops of a thermosetting resin at a viscosity of 1300 mPa·s (PJ3001, manufactured by JSR Co.) were dripped to the input/output portion at one end of the template. The template and ARTON film were adhered closely, which were placed in a container depressurized by a vacuum pump (1.0 Pa). The UV-ray curable resin was filled into the concaves instantly by the capillary phenomenon. After taking out the same from the container, the upper portion of the template was irradiated with UV-light at 50 mW/cm² for 5 minutes to conduct curing and the template was peeled. A core with a refractive index of 1.591 was formed on the ARTON film.

Further, after coating a thermosetting resin with the refractive index after curing of 1.510 which is identical with that of the ARTON film (manufactured by JSR Co.) over the entire surface of the core forming surface of the ARTON film, it was cured by applying UV-rays of 50 mW/cm² for 10 minutes (film thickness after curing: 10 µm). A flexible optical waveguide channel sheet (50 mm×300 mm) was obtained. The loss of the polymeric optical waveguide channel was 0.33 dB/cm.

Then, a 1×4 surface light emitting laser array (VCSEL-AM-0104, manufactured by Fuji Xerox Co., Ltd.) was attached at a 50-µm gap to the core end face of the optical waveguide channel sheet prepared as described above to form a flexible polymeric waveguide channel with the surface light emitting laser array.

Example 4

A flexible optical waveguide channel sheet (50 mm×300 mm) was prepared in the same manner as in Example 3, except for closely adhering a template to an ARTON film, sucking from one end of the input/output portion of the template by a diaphragm type suction pump (maximum suction pressure: 33.25 KPa) instead of dripping several drops of the UV-ray curable resin to the input/output portion at the other end of the template and placing the same in a container depressurized by the vacuum pump in Example 3. The loss of the polymeric optical waveguide channel was 0.33 dB/cm.

Then, a 1×4 surface light emitting laser array (VCSEL-AM-0104, manufactured by Fuji Xerox Co., Ltd.) was attached at a 50-µm gap to the core end face of the optical waveguide channel sheet prepared as described above to form a flexible polymeric waveguide channel with the surface light emitting laser array.

Example 5

The steps up to formation of the core on the ARTON film in Example 1 were conducted by the same procedures.

Then, the ARTON film (thickness: 188 µm) was bonded to the core forming surface of the ARTON film by use of an adhesive at a refractive index of 1.510 (manufactured by JSR Co.) to prepare a flexible optical waveguide channel sheet. The loss of the polymeric waveguide channel was 0.33 dB/cm.

Then, a 1×4 surface light emitting laser array (VCSEL-AM-0104, manufactured by Fuji Xerox Co., Ltd.) was attached at a 50-µm gap to the core end face of the optical waveguide channel sheet (50 mm×30 mm) prepared as described above to form a flexible polymeric waveguide channel with the surface light emitting laser array.

Example 6

A template was prepared by the same method as in Example 1. Then, the template and an ARTON film (thickness: 188 µm) slightly larger than the template were adhered closely. Several drops of a UV-ray curable resin at a viscosity of 100 mPa·s (manufactured by NTT-AT Co.) were dripped by to the input/output portion at one end of the template. When suction was conducted by a vacuum pump from the other end of the input/output portion of the template, the concaves were filled with a UV-ray curable resin by the capillary phenomenon. Then, the upper portion of the template was irradiated with UV-light at 50 mW/cm$^2$ for 5 minutes to conduct UV-ray curing. When the template was peeled from the ARTON film, a core of the same shape as the original base convexes was formed on the ARTON film. The refractive index of the core was 1.570.

Then, an ARTON film (188 µm thickness) was bonded to the core forming surface of the ARTON film by use of an adhesive at a refractive index of 1.510 (manufactured by JSR Co.) to prepare a flexible optical waveguide channel sheet (50 mm×300 mm). The loss of the polymeric optical waveguide channel was 0.15 dB/cm.

Then, a 1×4 surface light emitting laser array (VCSEL-AM-0104, manufactured by Fuji Xerox Co., Ltd.) was attached at a 50-µm gap to the core end face of the optical waveguide channel sheet prepared as described above to form a flexible polymeric waveguide channel with the surface light emitting laser array.

Example 7

An optical waveguide channel sheet (50 mm×300 mm) was prepared in the same manner as in Example 1 except for heating the UV-ray curable resin in advance to 70° C., dripping several drops of the resin to the input/output portion at one end of the template and then irradiating the same with UV-rays after lowering the temperature to the room temperature in Example 1. The loss of the polymeric optical waveguide channel was 0.35 dB/cm.

Then, a 1×4 surface light emitting laser array (VCSEL-AM-0104, manufactured by Fuji Xerox Co., Ltd.) was attached at a 50-µm gap to the core end face of the optical waveguide channel sheet prepared as described above to form a polymeric waveguide channel with the surface light emitting laser array.

Since the optical channel changing device such as a lens or a mirror is not necessary, the optical element according to this invention can be simplified extremely as a device. Further, since the flexible polymeric optical waveguide channel sheet is used and the light emitting portion is disposed to the end face thereof, the entire device has high flexibility and can be deformed simply by bending and the like. Further, it can be incorporated in a deformed state into an integrated circuit and can improve the integration degree of the integrated circuit greatly in conjunction with the simplification of the device.

The optical element according to this invention can be used for wide applications such as optical wiring in various states, for example, optical wiring between apparatuses, between boards in an apparatus and between chips in a board.

Further, in the manufacturing method of the optical element according to this invention, since it can be conducted by merely preparing a flexible polymeric optical waveguide channel sheet by an extremely simplified and low-cost method and then attaching the light emitting portion to the end face of the flexible polymeric optical waveguide channel sheet, this is an extremely simple and convenient method and can attain cost reduction to such an extent as comparison with optical elements using the existing polymeric optical waveguide channels is unreasonable.

The entire disclosure of Japanese Patent Application No. 2002-187474 filed on Jun. 27, 2002 including specification, claims, drawings and abstract is incorporated herein by reference in its entirety.

What is claimed is:
1. An optical element comprising
  a flexible polymeric optical waveguide channel sheet having a clad including a flexible film substrate, a core of a curing product of a UV-ray curable resin or a thermosetting resin disposed on the clad and a clad layer formed so as to cover the core, and
  a light emitting portion having a light emitting element and a frame that keeps a distance between the light emitting element and an end surface of the optical waveguide channel sheet, the frame fixed to the end face of the optical waveguide channel sheet.

2. An optical element according to claim 1, wherein the light emitting portion is a surface light emitting laser array having a plurality of emitting elements.

3. An optical element according to claim 2, wherein a distance between the respective emitting elements in the surface light emitting laser array is from 20 µm to 2 mm.

4. An optical element according to claim 1, further comprising a light receiving portion disposed to another end face in the flexible polymeric optical waveguide channel sheet.

5. An optical element according to claim 4, wherein the light receiving portion has a photodiode array.

* * * * *